United States Patent [19]

Vlasbloem et al.

[11] Patent Number: 4,896,041
[45] Date of Patent: Jan. 23, 1990

[54] DOSIMETER FOR IONIZING RADIATION

[75] Inventors: Hugo Vlasbloem, Maasland; Simon Duinker, Bloemendaal, both of Netherlands

[73] Assignee: B.V. Optische Industrie 'De Oude Delft', Delft, Netherlands

[21] Appl. No.: 931,538

[22] Filed: Nov. 14, 1986

[30] Foreign Application Priority Data

Nov. 15, 1985 [NL] Netherlands .......................... 8503152

[51] Int. Cl.[4] ............................................. G01T 1/205
[52] U.S. Cl. ................................. 250/385.1; 250/374; 250/354.1; 378/160
[58] Field of Search .................. 250/385.1, 354.1, 374; 378/108, 160, 145

[56] References Cited

U.S. PATENT DOCUMENTS

| | | | |
|---|---|---|---|
| 3,852,610 | 12/1974 | McIntyre | 250/385.1 |
| 3,984,691 | 10/1976 | Allemand et al. | 250/385 |
| 4,031,396 | 6/1977 | Whetten et al. | 250/385 |
| 4,032,784 | 6/1977 | Rich | 378/108 |
| 4,097,741 | 6/1978 | Pfeiler et al. | 378/108 |
| 4,119,853 | 10/1978 | Shelley et al. | 250/385 |
| 4,121,104 | 10/1978 | Richter | 378/108 |
| 4,193,000 | 3/1980 | Shirayama et al. | 250/385 |
| 4,211,926 | 7/1980 | Nakaya et al. | 250/385 |
| 4,230,944 | 10/1980 | Wiegman et al. | 250/385 |
| 4,433,430 | 2/1984 | Fredzell | 378/108 |
| 4,558,223 | 12/1985 | Broadhurst et al. | 250/385.1 |
| 4,675,893 | 6/1987 | Duinker et al. | 378/146 |
| 4,715,056 | 12/1987 | Vlasbloem et al. | 378/146 |

OTHER PUBLICATIONS

Dhawan et al., "A Multiwire Proportional Counter with 5 Wires per Millimeter", 1973 Int'l Conference on Instrumentation for High Energy Physics (May 1973), pp. 313–315.

*Handbook on Synchrotron Radiation*, E. Koch, Editor, vol. 14, North Holland Publishing Co., New York (1983), pp. 323–328.

Primary Examiner—Janice A. Howell
Assistant Examiner—William F. Rauchholz
Attorney, Agent, or Firm—Louis E. Marn

[57] ABSTRACT

A dosimeter for ionizing radiation is of oblong shape. It comprises a gas-filled measuring chamber surrounded by a casing. THe casing is formed of two oblong frames of insulating material that are substantially similar in shape. The two frames are mounted on each other in a gas-tight manner. The anode wires are situated in the plane of separation between the frames and are secured by the frames in contact with each other. At least one of the frames is provided with a cathode over its whole length and parallel to the plane in which the anode wires are situated. Along the edge of the cathode extends a guard electrode which surrounds the cathode with a certain gap. The dosimeter is made of materials that are transparant to the ionizing radiation. It can be used particularly in slit radiography equipment in which the slitwidth can be controlled locally and independently along the length of the slit.

30 Claims, 2 Drawing Sheets

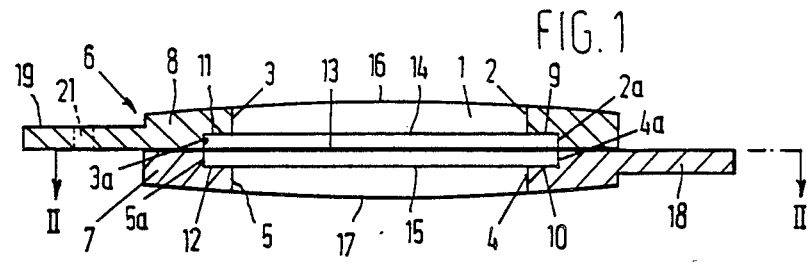
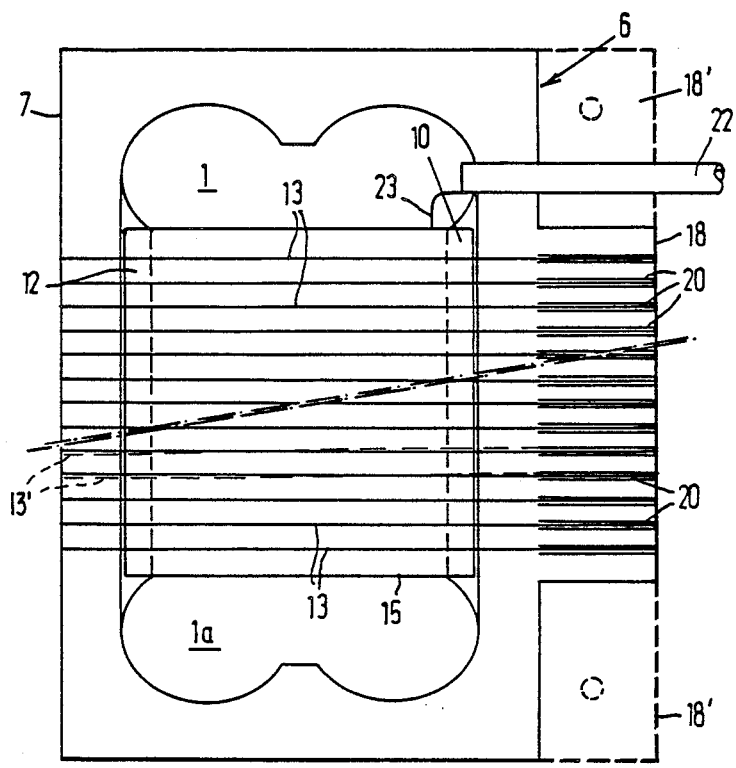

DOSIMETER FOR IONIZING RADIATION

BACKGROUND OF THE INVENTION

The invention relates to a dosimeter for ionizing radiation comprising a gas-filled measuring chamber surrounded by a casing in which there extend a number of anode wires, which carry a fixed electrical voltage in operation, and at least one cathode element, which casing is provided with at least one entry window for the ionizing radiation.

Such dosimeters are already known from the Handbook on Synchrotron Radiation, vol. 1A, pages 323–328 by Ernst Eckhard Koch, published by North-Holland Publishing Company, Amsterdam, New York, Oxford, 1983. A drawback of said known dosimeters is that application thereof in slit radiography equipment, in which, during the production of a radiograph, it has to be possible to measure and regulate the quantity of radiation in each diaphragm section transmitted through a diaphragm slit at any instant, is not readily possible. An example of such slit radiography equipment, in which use is not made, however, of a dosimeter of the type described above, is described in Dutch patent application No. 8400845. The known dosimeters are not designed to attenuate the radiation, the intensity of which has to be measured, as little as possible and to prevent the formation of a visible X-ray shadow image of the dosimeter itself as much as possible. This latter is, however, of great importance in slit radiography equipment because the radiation transmitted through the dosimeter has to produce the required radiograph. The shape and dimensions of the known dosimeters also make them unsuitable for application in slit radiography equipment.

SUMMARY OF THE INVENTION

There is therefore a need for a dosimeter for ionizing radiation, in particular X-ray radiation, which is suitable for application in slit radiography equipment.

The object of the invention is to meet said need. For this purpose a dosimeter of the type described is characterized according to the invention in that the casing has an oblong, essentially rectangular shape and that the measuring chamber is an oblong, essentially rectangular cavity which is recessed in the casing and in which there extends a relatively large number of parallel anode wires, distributed over essentially the whole length of the measuring chamber, in a direction essentially transverse to the longitudinal direction of the measuring chamber.

BRIEF DESCRIPTION OF THE DRAWINGS

The invention will be described in more detail below by reference to the accompanying drawing of an exemplary embodiment.

FIG. 1 shows a diagrammatic cross-section of an embodiment of a dosimeter according to the invention;

FIG. 2 shows a section along the line II—II in FIG. 1;

Figure 3:
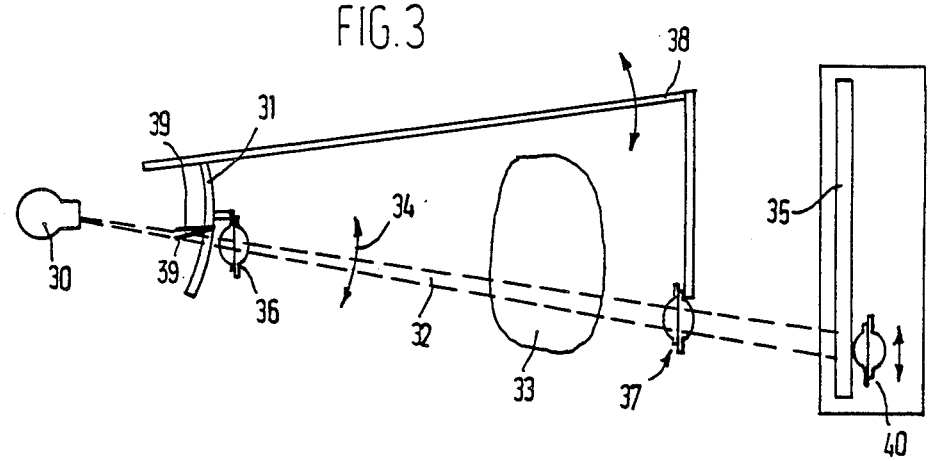
FIG. 3 shows diagrammatically how a dosimeter according to the invention can be applied in slit radiography equipment.

The dosimeter shown in FIGS. 1 and 2 comprises an oblong measuring chamber 1 having parallel long sides 2, 2a, 4, 4a or 3, 3a, 5, 5a. When applied in slit radiography equipment, the measuring chamber is at least equally as long as the width of the flat X-ray beam, which is transmitted through the slit diaphragm and which spreads out fan-like, at the point of the intended dose measurement. If the dose measurement has to take place in the immediate vicinity of the slit diaphragm, the measurement chamber may be equally as long as, or somewhat longer than, the diaphragm slit. The further away from the diaphragm slit the dose measurement is made, the longer the measuring chamber has to be. For measurement near the X-ray screen, the length of the measuring chamber may be, for example, 40 to 45 cm.

The measuring chamber is formed in an oblong casing 6 made of insulating material such as, for example, glass or ceramic material. The casing consists of two, essentially mirror-image parts 7, 8 which are attached to each other in a gas-tight manner, for example by fritting, fusing or gluing. Each casing part consists essentially of an oblong strip of an insulating material in which there is recessed an oblong groove approximately of the size of the measuring chamber to be formed so that an oblong frame is produced.

As can be seen in FIG. 1, both frames are provided with a recess along the innermost long edges and on the sides facing each other, as a result of which both frames form shoulders 9, 10, 11, 12 which face each other and extend along the long edges. The purpose of said shoulders will be described in more detail below.

Transversely to the longitudinal direction of the frames 7, 8 a large number of parallel thin anode wires 13, which carry a fixed electrical voltage in operation, extend through the measuring chamber 1; anode wires 13' (two shown) in lieu of anode wires 13 are illustrated as being disposed obliquely to the longitudinal direction of the frames 7,8. In a practical embodiment the anode wires may be, for example, gold-plated tungsten wires which, for example, have a spacing of 2.5 mm and a thickness of 50 μm.

DETAILED DESCRIPTION OF THE PREFERRED EMBODIMENTS

The anode wires are mounted so as to be distributed over essentially the whole length of the measuring chamber. The anode wires are situated in the plane of separation between the frames 7 and 8 and are secured by the surfaces of the frames which are in contact with each other.

The anode wires are situated, moreover, in the center plane between two parallel flat cathode elements 14, 15 which are mounted on the shoulders 10, 12 and on the shoulders 9, 11 of the two frames. The two cathode elements are electrically connected to each other. It is pointed out that in principle, however, it would be possible to make do with one cathode element.

The cathode elements may consist of a wire grid, but according to a preferred embodiment of the invention, each is constructed of a thin insulating sheet-like carrier on which a conducting metal layer is provided on the side facing the anode wires. The carrier may be manufactured from a suitable plastic material or another suitable material such as glass.

Figure 4:
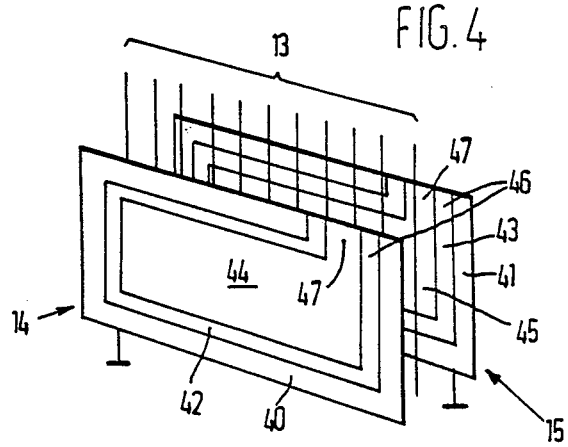
FIG. 4 shows an example of a cathode element for a dosimeter according to the invention.

FIG. 4 shows a preferred embodiment of the cathode elements 14, 15 which are here diagrammatically shown in their mutual relationship and in their relationship to the anode wires 13, the rest of the dosimeter having been omitted for the sake of clarity. The cathode elements shown in FIG. 4 each comprise in turn a thin sheet-like carrier which is provided with a guard electrode 40 or 41, which is connected to ground along the edges. Inside each guard electrode there is situated the actual cathode 44 or 45 which is insulated with respect to the guard electrode by a narrow gap 42 or 43. The guard electrodes serve to remove any leakage currents, as a result of which the signal/noise ratio of the output signal of the dosimeter is improved.

Figure 5:
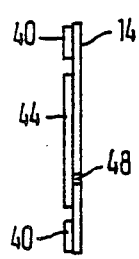
FIG. 5 shows diagrammatically an end view of a variation of FIG. 4.

In the embodiment shown in FIG. 4 the guard electrodes are discontinued at 46 in order to form a passage for a connecting section 47 of the cathodes. The operation of the guard electrodes can be optimized further, if desired, by constructing the guard electrodes without discontinuity. A connection bridging the guard electrodes then has to be provided for the cathodes. For this purpose, for example, a connection which is brought through an opening in the carrier may be provided, as is shown diagrammatically by way of example at 48 in FIG. 5 for the cathode element 14. The passage 48 is shown diagrammatically in FIG. 5 for the cathode element 14. The passage 48 or another electrical connection of the cathodes is situated preferably outside the region of the anode wires.

In a practical embodiment the carriers may consist of glass film with a thickness of approx. 80 $\mu$m which is mounted on the shoulders 9, 11 or 10, 12 respectively by fritting. A thin layer of gold or silver or another metal with good conductivity may be provided on the carriers by evaporation.

At least one head end 1a of the measuring chamber 1 extends in the longitudinal direction beyond the flat cathodes and the region of the anode wires so that the cavity between the cathodes is in communication with the cavities on the sides of the cathodes facing away from the anode wires.

The measuring chamber is, moreover, sealed in a gas-tight manner by windows 16, 17 which are manufactured from a material which does not attenuate, or scarcely attenuates, the X-ray radiation. In a practical embodiment the windows may, for example, be manufactured from glass film having a thickness of 0.5 mm.

The windows are preferably constructed in a curved manner because of strength considerations. In FIG. 1 the windows 16, 17 are constructed somewhat convexly. It is, however, also possible to construct the windows concavely as seen from the outside. Such a construction can be applied with advantage if the internal pressure in the dosimeter is at least during some period greater than the ambient pressure, as may be the case, for example, during transportation by air.

In the exemplary embodiment shown, both frames 7, 8 have an external flange 18 or 19 respectively (FIG. 1) which extends along the plane of separation between the frames and in the longitudinal direction of the frames. On one of the flanges, e.g., the flange 18, referring to FIG. 2 a narrow conducting track 20, for example a silver track, is provided in line with each anode wire 13. The end of an anode wire is mounted by soldering on each track. The flange 18 with the conducting tracks may advantageously be constructed as a connector so that the signals from the anode wires can be supplied in a simple manner to processing equipment for said signals.

The flange 19 of the frame 8 shown in FIG. 1 could, if desired, be provided in a similar manner with connection tracks for the anode wires. This is not, however, necessary, and in the exemplary embodiment shown the flange 19 is constructed as a mounting flange, by means of which the dosimeter may be mounted on a carrier or the like. For this purpose, the flange 19 is provided with a number of fixing holes 21, one of which is shown.

An advantage of the embodiment shown is that the two frames 7, 8 can have exactly the same shape, which simplifies the manufacture.

As an alternative, however, the flange 19 may be omitted as shown in FIG. 2, and the flange 18 could be constructed somewhat longer as is indicated by the broken lines at 18', and may be provided with fixing holes.

In FIG. 2 a tubular stem 22 is also shown which is in communication with the measuring chamber and which can be connected to a vacuum pump to evacuate the measuring chamber. The measuring chamber is then filled with a suitable gas such as, for example, a mixture of Ar and $CH_4$, which may have a pressure of 1 atm.

The tubular stem can then be sealed by pinching. If desired, the other frame 8 may also be provided with such a tubular stem.

The tubular stem may advantageously serve as a connecting conductor for the cathodes 14 and 15 or for the guard electrodes. In FIG. 2 an electrical connection is shown between the tubular stem 22 and the cathode 15 at 23.

In relation to the gas situated in the measuring chamber it is further pointed out that the argon gas produces the output signal under the influence of ionizing radiation at the electrodes, while methane gas is added as a quenching gas ("quenching agent") in order to counteract the so-called avalanche effect. Preferably, however, the anode/cathode voltage is chosen so that the avalance effect does not normally occur. The methane gas could then be omitted.

Since Ar is relatively transparent to ionizing radiation, to obtain a sufficiently large output current (greater than approx. $10^{-10}$ A), it is necessary to work in the so-called gas-multiplication region, as a result of which a signal amplification by, for example, a factor of 1000 can be obtained, depending on the chosen anode/cathode voltage. If the dosimeter forms part of a regulating circuit for controlling the amount of X-ray radiation transmitted per section of a slit diaphragm of slit radiography equipment, this also opens up at the same time the possibility of adjusting the gain for the regulating circuit belonging to each section of the slit diaphragm by means of the anode/cathode voltage of the dosimeter.

FIG. 3 illustrates some possibilities of application of a dosimeter according to the invention in slit radiography equipment. It is pointed out that the dosimeter may also be applied in other situations and is in particular suitable, in general, for detecting the distribution and variation of the intensity of ionizing radiation over an extensive region.

If only the total dose of ionizing radiation is of interest in the measurement region, the signals from the anode wires can be added together or the anode wires can be connected together.

FIG. 3 shows diagrammatically slit radiography equipment having an X-ray source 30 which can irradiate a body 33 to be investigated with a flat X-ray beam 32 having a scanning movement indicated by an arrow 34 via a slit diaphragm 31 in order to form an X-ray image by means of an X-ray detector 35 placed behind the body.

If it is only desired to determine the total X-ray dose to which the body 33 is exposed during one or more scanning movements, the dosimeter may be disposed in the vicinity of the slit diaphragm or even against the slit diaphragm as shown diagrammatically at 36.

The output signals from the dosimeter cannot then be used, however, to control the quantity of radiation transmitted locally through the slit diaphragm in order to obtain an equalized radiograph. For this purpose, the dosimeter has to be situated, as indicated at 37, between the body 33 and the X-ray detector 35 and obviously has to track the scanning movement of the X-ray beam 32. The dosimeter may be mounted, for example, on an arm 38 which moves synchronously with the slit diaphragm. The output signals from one anode wire or from a number of adjacent anode wires each time provide a measure of the irradiation intensity prevailing instantaneously in the associated sector of the X-ray beam and, therefore, also of the brightness of the part of the radiograph to be produced corresponding to said sector. Said output signals can therefore be used to control attenuating elements 39 which interact with the corresponding section of the slit diaphragm in order to achieve image equalization.

In order to prevent large differences between the output signals of (sets of) anode wires of the dosimeter which interact with adjacent sections of the slit diaphragm, the output signal from each set of anode wires belonging to a certain diaphragm section or, if one anode wire is present for each diaphragm section, from each anode wire may be combined, if desired, with the output signal from one or more anode wires belonging to adjacent sections of the slit diaphragm, in order to obtain the control signal for the section concerned.

In a practical embodiment a dosimeter according to the invention may have a measuring chamber which is 40 cm long and contains 160 anode wires. If the slit diaphragm has, for example, 20 controllable sections, 8 wires are available per section. The signals from said 8 wires are then combined into a control signal for the associated diaphragm section. However, as described above, the output signals of one or more adjacent wires belonging to adjacent sections might also be additionally involved in the formation of the control signal.

Depending on the type of X-ray detector used, it is possible, as an alternative, to control the attenuation elements on the basis of the radiation transmitted by the X-ray detector 35. The dosimeter may then be sited behind the X-ray detector, as indicated at 40, and must therefore again move synchronously along with the scanning movement of the X-ray beam 32.

In any case it is an advantage that a dosimeter according to the invention can be constructed with a very small thickness, in the order of 10 mm or less.

Despite the fact that very thin anode wires may be used, there is the risk that the anode wires may give rise to artefacts in the form of thin stripes in the radiograph to be produced. If desired, this can be prevented by ensuring that the wires extend somewhat obliquely with respect to the scanning direction. This can be achieved in a simple manner by mounting the dosimeter itself somewhat obliquely with respect to the scanning direction or by mounting the anode wires at a small angle with respect to the centre line of the dosimeter.

While the invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equilvalents thereof.

What is claimed is:

1. A dosimeter for ionizing radiation comprising a casing defining a gas-filled measuring chamber in which there is provided a plurality of anode wires and at least one cathode element and wherein said casing is provided with at least one entry window for ionizing radiation, characterized in that said casing is comprised of essentially rectangularly shaped-frames of insulating material defining an oblong measuring chamber, said frames of insulating material mounted to each other in gas-tight manner and essentially transparent to ionizing radiation, an innermost long edge of each frame of insulating material being provided with a shoulder extending parallel to said plane of said anode wires, each shoulder of said frame supporting a flat cathode element at a distance from said anode wires, said cathode element extending essentially over a length of said oblong measuring chamber and being essentially flat, said cathode element being mounted in at least one of said frames and parallel to a plane of said anode wires, said anode wires are disposed parallelly to one another in said chamber in a plane of separation between said frame over essentially a length of said oblong measuring chamber essentially transverse to said oblong measuring chamber.

2. The dosimeter according to claim 1 wherein each cathode element consists of a thin insulating carrier provided with a metal layer.

3. The dosimeter according to claim 2 wherein said thin insulating carrier is a glass film and said metal layer is of a noble metal deposited by evaporation.

4. The dosimeter according to claim 1 wherein each cathode element is mounted on an associated frame of insulating material by fritting.

5. The dosimeter according to claim 1 or 4 wherein each cathode element is provided with a quard electrode extending around said cathode element and spaced apart from said cathode element by a gap.

6. The dosimeter according to claim 1 wherein said oblong measuring chamber is sealed in a gas-tight manner by glass plates mounted in a gas-tight manner to surfaces of said frames.

7. The dosimeter according to claim 1 wherein one of said frames is formed with a flange extending in said longitudinal direction of said frame and having a surface coincident with said plane of separation, said flange being provided with conducting tracks extending parallel on said surface transversely to said longitudinal direction, each of said anode wires being mounted in a corresponding one of said conducting tracks to provide one anode wire per track.

8. The dosimeter according to claim 7 wherein said flange is a connector.

9. The dosimeter according to claim 1 wherein said frames are formed with a flange extending in said longitudinal direction of said frames and having a surface coincident with said plane of separation, one of said flanges being provided with conducting tracks extending on said surface transversely to said longitudinal direction, each of said anode wires being mounted in a corresponding one of said conducting tracks to provide one anode wire per track.

10. The dosimeter according to claim 9 wherein said flange provided with said conducting tracks is a connector.

11. The dosimeter according to claim 1 wherein said anode wires are disposed obliquely with respect to said longitudinal direction of said oblong measuring chamber.

12. The dosimeter according to claim 1 wherein said oblong measuring chamber is filled with an argon-containing gas and anode/cathode voltage during operation is such that gas multiplication occurs.

13. The dosimeter according to claim 12 wherein said oblong measuring chamber includes methane in admixture with argon.

14. An apparatus for slit radiography, which comprises:
an X-ray source;
an X-ray detector collecting radiation passing through a body to be radiographed;
a slit diaphragm positioned between said X-ray source and said body for forming a planar X-ray beam;
a plurality of attenuating elements positioned along said slit diaphragm forming a plurality of attenuating sections;
means for scanning said body with said planar X-ray beam;
a detection member disposed in a path of said planar X-ray beam to measure ionizing radiation comprised of an oblong-shaped casing defining an oblong measuring chamber, a plurality of wire electrodes extending transversely to a longitudinal direction of said oblong-shaped casing, a cathode electrode positioned within said oblong measuring chamber, said electrodes capable of being connected to a source of electromotive force, each of said wire electrodes generating a signal representative of intensity of ionizing radiation, a group of said wire electrodes corresponding to a respective attenuating element;
means for moving said detection member in synchronization with said means for scanning said body with said planar X-ray beam; and
means for simultaneously controlling each of said attenuating elements during scanning of said body in response to electric signals produced at a respective group of said wire electrodes.

15. The apparatus for slit radiography as defined in claim 14 wherein said casing is formed of two frame members of an insulating material mounted in a gas-tight manner and wherein said wire electrodes are disposed in a plane of separation of said frame members.

16. The apparatus for slit radiography as defined in claim 15 and further including a glass plate mounted in a gas-tight manner to each frame member.

17. The apparatus for slit radiography as defined in claim 15 wherein one of said frames is formed with a flange extending in said longitudinal direction of said frame and having a surface coincident with said plane of separation, said flange being provided with conducting tracks extending parallel in said surface transversely to said longitudinal direction, each of said anode wires being mounted in a corresponding one of said conducting tracks to provide one anode wire per track.

18. The apparatus for slit radiography as defined in claim 17 wherein said flange is a connector.

19. The apparatus for slit radiography as defined in claim 15 wherein said cathode electrode extends essentially over a length of said oblong measuring chamber and is mounted to a frame member in parallel relationship to a plane of said wire electrodes.

20. The apparatus for slit radiography as defined in claim 15 wherein each frame member is provided along an innermost long edge thereof with a shoulder extending parallel to said plane of said wire electrodes, each of said shoulder supporting a cathode electrode.

21. The apparatus for slit radiography as defined in claim 20 wherein each of said cathode electrodes is mounted by fritting on an associated frame member.

22. The apparatus for slit radiography as defined in claim 20 wherein each cathode electrode is provided with a guard electrode extending around said cathode electrode and spaced apart from said cathode element by a gap.

23. The apparatus for slit radiography as defined in claim 14 wherein each cathode electrode is formed of an insulating material provided with a metal layer.

24. The apparatus for slit radiography as defined in claim 23 wherein said insulating material is glass and said metal layer is a noble metal deposited by evaporation.

25. The apparatus for slit radiography as defined in claim 14 wherein said frame members are formed with a flange extending in said longitudinal direction of said frame members and having a surface coincident with said plane of separation, one of said flanges being provided with conducting tracks extending on the said surface transversely to said longitudinal direction, each of said anode wires being mounted in a corresponding one of said conducting tracks to provide one anode wire per track.

26. The apparatus for slit radiography as defined in claim 25 wherein said flange provided with said conducting tracks is a connector.

27. The apparatus for slit radiography as defined in claim 14 and further including a tubular stem in gaseous communication with said oblong measuring chamber and being sealed by pinching, said tubular stem serving as an electrical connecting terminal for said cathode element.

28. The apparatus for slit radiography as defined in claim 14 wherein said anode wires are disposed obliquely with respect to said longitudinal direction of said oblong measuring chamber.

29. The apparatus for slit radiography as defined in claim 14 wherein said oblong measuring chamber is filled with an argon-containing gas and anode/cathode voltage during operation is such that gas multiplication occurs.

30. The apparatus for slit radiography as defined in claim 29 wherein said oblong measuring chamber includes methane in admixture with argon.

* * * * *